United States Patent [19]

Okamoto et al.

[11] 4,376,021

[45] Mar. 8, 1983

[54] PROCESS FOR PRODUCING A WATER-SOLUBLE VINYL POLYMER

[75] Inventors: Jiro Okamoto, Takasaki; Isao Ishigaki, Maebashi; Hironobu Fukuzaki, Takasaki; Shozo Shimbo, Kakogawa; Kiyoaki Yoshikawa, Kobe, all of Japan

[73] Assignees: Japan Atomic Energy Research Institute, Tokyo; Taki Chemical Co. Ltd., Hyogen, both of Japan

[21] Appl. No.: 245,204

[22] Filed: Mar. 18, 1981

[30] Foreign Application Priority Data

Mar. 24, 1980 [JP] Japan ................................. 55-39958

[51] Int. Cl.³ .............................................. C08F 2/54
[52] U.S. Cl. ............................ 204/159.16; 204/159.2
[58] Field of Search ......................... 204/159.16, 139.2

[56] References Cited

U.S. PATENT DOCUMENTS 3,467,488  9/1969  Timmerman ............................ 8/116
3,943,045  3/1976  Cordrey et al. ................. 204/159.16
4,086,411  4/1978  Nagano et al. .................... 204/159.2
4,133,909  1/1979  Spencer .......................... 204/159.16

FOREIGN PATENT DOCUMENTS 48-41267  12/1973  Japan .
53-55390   5/1978  Japan .

OTHER PUBLICATIONS

Bovey, "The Effects of Ionizing . . . ", 1958, Insterscience Pub., Inc., N.Y., pp. 138–148.

*Primary Examiner*—John C. Bleutge
*Assistant Examiner*—A. H. Koeckert
*Attorney, Agent, or Firm*—Browdy & Neimark

[57] ABSTRACT

A water-soluble vinyl polymer is produced by polymerizing a water-soluble vinyl monomer in the presence of a catalyst or under the action of ultraviolet rays to prepare a polymer having a degree of polymerization of at least 95%, adjusting the water content of the system containing said polymer to be within the range of from 15 to 30%, and irradiating said system with ionizing radiation.

4 Claims, No Drawings

PROCESS FOR PRODUCING A WATER-SOLUBLE VINYL POLYMER

BACKGROUND OF THE INVENTION

This invention relates to a novel process for producing a water-soluble vinyl polymer having low residual monomer content.

BRIEF DESCRIPTION OF THE PRIOR ART

Recently, water-soluble vinyl polymers, especially acrylamide polymers, have begun to be used in large quantities as an aid in water treatment, paper strength modifier and soil stabilizer. But since the residual monomer in the polymer is toxic, regulations on the monomer content are getting more rigorous, and researchers are making efforts to increase the degree of polymerization or remove the residual monomer from the polymer. Two methods have so far been developed to increase the degree of polymerization; (1) using a low-temperature decomposing catalyst and a high-temperature decomposing catalyst, and (2) using propionamide. Three methods have been developed to remove the residual monomer from the polymer; (1) extracting the residual monomer with an organic solvent such as methanol or acetone, (2) degrading the residual monomer with a microorganism, and (3) reacting the residual monomer with ammonia or amine. But none of these methods is suitable for industrial application because they involve complicated procedures, require a lot of time to remove the monomer, or cannot remove the monomer to a satisfactory extent.

Therefore, we have made various studies on a method for producing a water-soluble polymer having an increased degree of polymerization and reduced residual monomer content and which also has properties suitable for use as an aid in water treatment. As a result, we have accomplished an invention which is described hereunder.

SUMMARY OF THE INVENTION

It is, therefore, an object of this invention to provide a process for producing a water-soluble vinyl polymer having low residual monomer content.

It is a further object of this invention to provide a process for producing a water-soluble vinyl polymer which comprises polymerizing a water-soluble vinyl monomer in the presence of a catalyst or under the action of ultraviolet rays to prepare a polymer having a degree of polymerization of at least 95%, adjusting the water content of the system containing said polymer to be within the range of from 15 to 30%, and irradiating said system with ionizing radiation.

Other objects and advantages of the present invention will be apparent to those skilled in the art from a consideration of the description of this invention.

DETAILED DESCRIPTION OF THE INVENTION

This invention relates to a novel process for producing a water-soluble vinyl polymer having low residual monomer content.

This invention provides a process for producing a water-soluble vinyl polymer which comprises polymerizing a water-soluble vinyl monomer in the presence of a catalyst or under the action of ultraviolet rays to prepare a polymer having a degree of polymerization of at least 95%, adjusting the water content of the system containing said polymer to be within the range of from 15 to 30%, and irradiating said system with ionizing radiation. We have confirmed that the water-soluble vinyl polymer produced by this process has properties suitable for use as an aid in water treatment.

Examples of the vinyl monomer used in this invention include dimethylaminoethyl (meth)acrylate, diethylaminoethyl (meth)acrylate, tertiary amine salts thereof such as hydrochloride, sulfate and acetate; quaternary ammonium salts of these esters obtained by quaternizing them with methyl chloride, dimethyl sulfate, diethyl sulfate, etc.; acrylic acid, methacrylic acid, or esters thereof; and acrylamide and methacrylamide. These vinyl monomers are homo- or co-polymerized in the presence of a catalyst or by the action of ultraviolet rays until the degree of polymerization is at least 95%. One reason the degree of polymerization is defined to be at least 95% is that it is fairly easy to obtain that value by polymerization in the presence of a catalyst or under the action of ultraviolet rays. Another reason is that if a polymer having a degree of polymerization of less than 95% is irradiated with ionizing radiation to polymerize the residual monomer, the polymer is either decomposed or partially crosslinked and, therefore a polymer having properties suitable for use as an aid in water treatment can not be produced.

The system containing the polymer having a degree of polymerization of at least 95% is then adjusted to have a water content in the range of from 15 to 30%. To do this, polymerization may be conducted with a monomer content of from about 60 to 80% in consideration of evaporation of water that takes place to a slight extent during polymerization, or alternatively, polymerization conducted with a higher monomer content may be followed by addition of water. In another modification, polymerization is conducted with a low monomer content of, say, from 30 to 50%, and the water in the polymer is removed by drying or any other suitable means until its content is in the range of from 15 to 30%. In still another embodiment, the polymer-containing system is ground to particles, to which water is then added.

The polymer-containing system having its water content adjusted to between 15 and 30% is subsequently irradiated with ionizing radiation. Suitable examples of the ionizing radiation are gamma-rays, accelerated electron beams and X-rays. The preferred dose rate is in the range of from 500 to 200,000 rad, preferably from 5,000 to 100,000 rad, per hour.

This invention is now described in greater detail by reference to the following examples and reference example which are given here for illustrative purposes only and are by no means intended to limit the scope of the invention.

EXAMPLE 1

A mixture of 216 g of an acrylamide monomer, 285 g of dimethylaminoethyl methacrylate, 5 g of propylene glycol, and 0.5 g of benzoinisopropyl ether was dissolved in 500 g of water, and the solution was treated with hydrochloric acid to adjust its pH to 2.8. The solution was then placed in a vat where it was irradiated with ultraviolet rays from a 400 W high-pressure mercury lamp for 30 minutes to prepare a polymer having a water content of 44.6% and a degree of polymerization of 97.4%. Polymers prepared in this manner were dried at 60° C. to the water contents shown in Table 1 below. The polymers were then irradiated with gamma-rays from cobalt 60 in air or a nitrogen gas atmosphere at a dose rate of $10^5$ rad/hr for 30 minutes. The residual monomer content in each of the irradiated polymers was measured. The results are also shown in Table 1.

TABLE 1

| Water cont. (%) | residual monomer cont. (in air)* (%) | residual monomer cont. (in $N_2$)* (%) |
|---|---|---|
| 5 | 2.340 | 2.288 |
| 10 | 1.820 | 1.690 |
| 12 | 0.520 | 0.260 |
| 15 | 0.039 | 0.003 |
| 20 | 0.012 | not detected |
| 25 | 0.029 | 0.003 |
| 28 | 0.047 | 0.007 |
| 30 | 0.081 | 0.013 |
| 35 | 0.130 | 0.053 |
| 40 | 0.260 | 0.082 |

*the ratio of residual monomer to polymer

As is clear from Table 1, the residual monomer content was minimum when the water content in the polymer was in the range of from 15 to 30%, and a particularly good result was obtained when the water content was 20% and the irradiation was conducted in a nitrogen atmosphere. The polymers produced according to this invention were good flocculants.

EXAMPLE 2

A mixture of 100 g of acrylamide, 0.05 g of $\alpha,\alpha'$-azobis(2-amidinopropane)dihydrochloride, and 400 g of water was purged thoroughly with nitrogen gas, and subjected to polymerization at 45° C. for 1.5 hours. The resulting polymer had a degree of polymerization of 96.81% and a water content of 79.2%. The polymer was dried at 60° C. to a water content of 17.3% and irradiated with gamma-rays from cobalt 60 at a dose rate of 50,000 rad/hr for one hour. The irradiated polymer contained 0.013% of residual acrylamide based on the polymer.

REFERENCE EXAMPLE 1

A mixture of 100 g of acrylamide, 0.05 g of $\alpha,\alpha'$-azobis(2-amidinopropane)dihydrochloride, and 400 g of water was purged with nitrogen gas thoroughly, and subjected to polymerization at 45° C. for one hour. The resulting polymer had a degree of polymerization of 92.3% and a water content of 79.0%. The polymer was dried at 60° C. to a water content of 17.3% and irradiated with gamma-rays from cobalt 60 at a dose rate of 50,000 rad/hr for 3 hours. The irradiated polymer contained 0.012% of residual acrylamide based on the polymer.

TEST OF WATER TREATMENT

A suspension of 5 g of kaolinite described in the Japanese Pharmacopaeia in 500 cc of tap water was mixed with 1 ml of a 0.1% solution of the acrylamide polymer of Example 2 or Reference Example 1. The mixture was stirred vigorously at 150 rpm for one minute, then stirred gently at 50 rpm for 3 minutes, and the settling velocity of flocs was measured. After standing for 5 minutes, the turbidity of the supernatant was determined. For the mixture containing the acrylamide polymer of Example 2, the settling velocity was 49 cm/min and the turbidity was 1.8 ppm. whereas the mixture containing the polymer of Reference Example 1, the respective values were 26 cm/min and 21 ppm.

EXAMPLE 3

A mixture of 200 g of a methyl chloride salt of dimethylaminoethyl methacrylate, 0.2 g of $\alpha,\alpha'$-azobis(2-amidinopropane)dihydrochloride and 300 g of water was purged thoroughly with nitrogen gas and subjected to polymerization at 50° C. for one hour. The resulting polymer had a degree of polymerization of 95.97% and a water content of 58.9%. The polymer was dried at 60° C. to a water content of 18.9% and irradiated with gamma-rays from cobalt 60 at a dose rate of 50,000 rad/hr for 40 minutes. The irradiated polymer had 0.018% of residual methyl chloride salt of dimethylaminoethyl methacrylate based on the polymer.

EXAMPLE 4

A mixture of 100 g of acrylic acid, 0.1 g of potassium persulfate, and 400 g of water was purged thoroughly with nitrogen gas and subjected to polymerization at 50° C. for 3 hours. The resulting polymer had a degree of polymerization of 97.37% and a water content of 79.1%. The resulting polymer was dried at 60° C. to a water content of 22.7%. The dried polymer was purged with nitrogen and irradiated with gamma-rays from cobalt 60 at a dose rate of 7,500 rad/hr for one hour. No residual acrylic acid was detected in the irradiated polymer.

EXAMPLE 5

A mixture of 300 g of sodium vinylsulfonate, 0.3 g of benzoinisopropyl ether and 200 g of water was purged with nitrogen gas thoroughly and placed in a vat where it was irradiated with ultraviolet rays from a 400 W high-pressure mercury lamp for 30 minutes. The resulting polymer had a degree of polymerization of 95.3% and a water content of 37.2%. The polymer was dried at 60° C. to a water content of 21.6% and irradiated with X-rays at a dose rate of 50,000 rad/hr for one hour. The irradiated polymer contained 0.015% of residual sodium vinylsulfonate based on the polymer.

What is claimed is:

1. A process for producing a water-soluble vinyl polymer which comprises polymerizing a water-soluble vinyl monomer selected from the group consisting of dimethylaminoethyl acrylate, dimethylaminoethyl methacrylate, diethylaminoethyl acrylate, and diethylaminoethyl methacrylate; a tertiary amine salt thereof; a quaternary ammonium salt thereof; acrylic acid, methacrylic acid and an ester thereof; acrylamide and methacrylamide; in the presence of a catalyst or under the action of ultraviolet rays to prepare a water-soluble polymer having a degree of polymerization of at least 95%, adjusting the water content of the system containing said polymer to be within the range of from 15 to 30%, and then irradiating said system with ionizing radiation at a dose rate of 500 to 200,000 rad/m. to substantially reduce the residual monomer content without insolubilizing the polymer.

2. A process according to claim 1 wherein said system is adjusted to have a water content of about 20%.

3. A process according to any of the preceding claims wherein the system is irradiated with ionizing radiation in a nitrogen atmosphere.

4. A process according to any one of the preceding claims wherein the ionizing radiation is gamma-rays.

* * * * *

UNITED STATES PATENT AND TRADEMARK OFFICE
CERTIFICATE OF CORRECTION

PATENT NO. : 4,376,021
DATED : March 8, 1983
INVENTOR(S) : Okamoto et al.

It is certified that error appears in the above-identified patent and that said Letters Patent are hereby corrected as shown below:

ON THE PATENT COVER PAGE

Item [30], the foreign application priority data should read as follows:

--March 28, 1980 [JP] Japan......... 55-39958--.

Signed and Sealed this

Sixteenth Day of August 1983

[SEAL]

Attest:

GERALD J. MOSSINGHOFF

Attesting Officer     Commissioner of Patents and Trademarks